(12) United States Patent
Feng (10) Patent No.: US 9,894,518 B2
(45) Date of Patent: *Feb. 13, 2018

(54) SERVER AND METHOD FOR REMOTELY CONTROLLING WORKING OF COMMUNICATIONS TERMINAL, AND COMMUNICATIONS TERMINAL

(71) Applicant: Huawei Technologies Co., Ltd., Shenzhen (CN)

(72) Inventor: Yaxia Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,165

(22) Filed: Oct. 18, 2016

(65) Prior Publication Data

US 2017/0041781 A1    Feb. 9, 2017

Related U.S. Application Data

(63) Continuation of application No. 14/566,485, filed on Dec. 10, 2014, now Pat. No. 9,503,903, which is a
(Continued)

(51) Int. Cl.
*H04W 12/02* (2009.01)
*H04W 4/14* (2009.01)
(Continued)

(52) U.S. Cl.
CPC ............ *H04W 12/02* (2013.01); *H04W 4/14* (2013.01); *H04W 8/245* (2013.01); *H04W 12/12* (2013.01);
(Continued)

(58) Field of Classification Search
CPC ............ H04W 4/06; H04W 4/12; H04W 4/14; H04W 4/20; H04W 88/184; H04W 12/06; H04W 12/10; H04W 12/12
(Continued)

(56) References Cited

U.S. PATENT DOCUMENTS

2007/0165654 A1    7/2007  Chai et al.
2010/0210240 A1*   8/2010  Mahaffey ............ H04L 41/0253
                                                          455/411
(Continued)

FOREIGN PATENT DOCUMENTS

CN          1801743 A          7/2006
CN          1819705            8/2006
(Continued)

*Primary Examiner* — Jean Gelin
(74) *Attorney, Agent, or Firm* — Slater Matsil, LLP (57) ABSTRACT

The present invention discloses a method for remotely controlling working of a communications terminal, and the method includes: receiving, in a push service manner, a management and control instruction actively provided by the server; parsing, according to a predetermined data exchange format, the received management and control instruction, so as to obtain corresponding operation information and acquire a device identifier, where the operation information includes command information and additional information; generating a corresponding working instruction according to the command information and the additional information that are obtained through parsing; and executing, according to the working instruction, work for protecting data security. The present invention further provides a server for remotely controlling working of a communications terminal, and a communications terminal. The present invention is capable of flexibly and conveniently controlling working of a lost communications terminal through the server for remotely controlling working of a communications terminal.

20 Claims, 6 Drawing Sheets

Related U.S. Application Data continuation of application No. PCT/CN2012/087166, filed on Dec. 21, 2012.

(51) Int. Cl.
    *H04W 12/12*     (2009.01)
    *H04W 8/24*     (2009.01)
    *H04M 1/725*     (2006.01)

(52) U.S. Cl.
    CPC .... *H04M 1/72552* (2013.01); *H04M 1/72563* (2013.01)

(58) Field of Classification Search
    USPC ............. 455/418, 419, 420, 410, 411, 414.1, 455/435.1, 466
    See application file for complete search history.

(56) References Cited

U.S. PATENT DOCUMENTS

| | | | | |
|---|---|---|---|---|
| 2010/0279675 A1* | 11/2010 | Slack | ............... | G06F 9/4843 455/419 |
| 2012/0173610 A1* | 7/2012 | Bleau | ............... | H04L 67/26 709/203 |
| 2012/0196571 A1* | 8/2012 | Grkov | ............... | H04L 63/14 455/411 |
| 2012/0210334 A1* | 8/2012 | Sutedja | ............... | G06Q 10/107 719/314 |
| 2012/0231770 A1* | 9/2012 | Clarke | ............... | H04L 51/34 455/414.1 |
| 2012/0254281 A1* | 10/2012 | Nakamura | ............ | H04L 67/025 709/201 |
| 2012/0331039 A1* | 12/2012 | Tillman | ............... | G06F 11/3072 709/203 |
| 2013/0084896 A1* | 4/2013 | Barkie | ............... | H04L 67/20 455/466 |
| 2013/0237204 A1* | 9/2013 | Buck | ............... | H04M 1/72569 455/418 |
| 2014/0282953 A1* | 9/2014 | Wietfeld | ............ | H04L 63/065 726/6 |
| 2015/0254457 A1* | 9/2015 | Wade | ............... | G06F 21/54 726/1 |
| 2016/0066189 A1* | 3/2016 | Mahaffey | ............ | G06F 21/316 455/405 |

FOREIGN PATENT DOCUMENTS

| | | |
|---|---|---|
| CN | 101493779 A | 7/2009 |
| CN | 101799677 A | 8/2010 |
| CN | 102960000 A | 3/2013 |
| EP | 2814201 A1 | 12/2014 |
| WO | 2007027065 A1 | 3/2007 |
| WO | 2010067263 A2 | 6/2010 |

* cited by examiner

SERVER AND METHOD FOR REMOTELY CONTROLLING WORKING OF COMMUNICATIONS TERMINAL, AND COMMUNICATIONS TERMINAL

CROSS-REFERENCE TO RELATED APPLICATIONS

This application is a continuation of U.S. patent application Ser. No. 14/566,485, filed on Dec. 10, 2014, which is a continuation of International Application No. PCT/CN2012/087166, filed on Dec. 21, 2012. Both of the aforementioned applications are hereby incorporated by reference in their entireties.

TECHNICAL FIELD

The present invention relates to the technical field of communications, and in particular, to a server and a method for remotely controlling working of a communications terminal, and a communications terminal.

BACKGROUND

Recently, communications terminals (such as, mobile phones) of people are lost time to time, and therefore how to timely and effectively control working of a mobile phone to ensure personal information security is the most difficult problem for each owner. For example, how to obtain a short message service (SMS) message in a lost mobile phone, how to lock a screen of the mobile phone to protect data security of the mobile phone, and how to acquire a current mobile phone number of the lost mobile phone (that is, the thief changes a card immediately after taking the mobile phone). Technical solutions for an owner to control working of a lost mobile phone have existed in the prior art.

For example, in a technical solution 1, a SIM card of an original number is inserted in a SMS message monitoring hardware apparatus, a SMS message sent to the number may be automatically transferred to a designated new number, and after the new number receives the SMS message, a sender of the SMS message is still a number of an original sender of the SMS message. The SMS message is received by using a SMS message monitor, and the SMS message monitor parses the SMS message to acquire information, such as SMS message content and a calling number, in the SMS message, encapsulates information such as the SMS message content, the calling number, and a called party identifier, and then sends the encapsulated information to a SMS message forwarding platform. The SMS message forwarding platform parses an encapsulated packet sent by the SMS message monitor, adds a transfer identifier and then encapsulates the packet into a SMS message data packet, and sends the SMS message data packet by using a number of a forwarding party as a number of a called party and a number of an original calling party of the SMS message as a number of a calling party.

However, the technical solution 1 has the following problems: when a user intends to implement SMS message forwarding, the SIM card thereof needs to be inserted into the SMS message monitor hardware, so that the technical problem that "a SMS message of a lost mobile phone cannot be forwarded to a designated mobile phone number" cannot be solved, and the technical problem that "a current mobile phone number of the lost mobile phone cannot be obtained" cannot be solved either, this is because that the user does not have the SMS message monitor hardware, the SIM card is not on the hand of the owner of the mobile phone owner, a sender of a received SMS message is an initial sender of the original SMS message, instead of being the current number of the lost mobile phone, and the number of the thief cannot be acquired.

For example, in a technical solution 2: a second communications terminal is used to remotely control SMS message forwarding of a first communicate terminal (a lost mobile phone), and the second communications terminal includes: a module for remotely controlling SMS message format setting, a SMS message filtering module, and a SMS message forwarding module, where the module for remotely controlling SMS message format setting is configured to set or start a message format of a SMS message forwarding function, the SMS message filtering module is configured to filter and screen a new incoming SMS message, and the SMS message forwarding module is configured to implement forwarding of the new SMS message.

However, the technical solution 2 has the following problems: a security number needs to be set in the first communications terminal first, a mobile phone of the security number is used as the second communications terminal to send a SMS message instruction to the first communications terminal, and because many users each have only one mobile phone number, the security number is another number that is often not their own and may be a number of a relative or a friend, when a mobile phone is lost or is forgotten to be carried, the mobile phone of the security number cannot be obtained in time for operation; in addition, forwarding a SMS message in the first communications terminal to the security number may cause privacy leakage of the owner.

For example, in a technical solution 3: a mobile phone IMEI anti-thief apparatus is implemented by using a computer database server system, the mobile phone IMEI anti-thief apparatus is interconnected with a SMS message gateway through a data network, and is configured to manage and maintain an IMEI state of a mobile phone of a user; the mobile phone IMEI anti-thief apparatus further receives a mobile phone loss report request of the owner, and sets an IMEI state of a mobile phone of the user reporting the loss into a lock state; the mobile phone IMEI anti-thief apparatus further receives a reported loss removal service request of the mobile phone user, and sets the IMEI state of the mobile phone of the user having removed the reported loss into a normal state; the mobile phone IMEI anti-thief apparatus further receives a power on SMS message initiated by a user of a mobile phone anti-thief terminal, and for an IMEI mobile phone in lock state, sends a mobile phone lock instruction to a mobile phone anti-thief execution gateway; the SMS message gateway is a network element in a mobile communication network and is interconnected with a SMS message center SMSC, and if a SMS message sending request of the mobile phone anti-thief execution gateway is received, the SMS message is sent to a target phone number through the SMSC; if a SMS message sent to a mobile phone IMEI anti-thief access number is received, the SMS message is sent to the mobile phone IMEI anti-thief apparatus, and the SMS message gateway can connect to the SMS message center SMSC to receiver a SMS message from the SMSC.

However, the technical solution 3 has the following problems: it is required to perform integrated modification on the SMS message gateway and the SMS message center, which consumes certain costs; the owner needs to perform a loss report request (through an operator) so as to perform a screen locking operation on the lost mobile phone, the loss report request increases time cost of the owner, and the owner has to set a mobile phone number binding an IMEI number instead of a random account such as an email, which has certain limitations.

SUMMARY

Embodiments described herein provide a server and a method for remotely controlling working of a communications terminal, and a communications terminal, so that it is capable of flexibly and conveniently controlling working of a lost communications terminal through the server for remotely controlling working of a communications terminal, thereby ensuring security of personal data in the communications terminal.

In one aspect, a server for remotely controlling working of a communications terminal is provided, the server for remotely controlling working of a communications terminal implements communication with a communications terminal through a network, and the server for remotely controlling working of a communications terminal includes: a receiving module, configured to receive operation information generated by an input operation of a registered user on a network terminal, where the operation information includes command information and additional information; an acquiring module, configured to acquire, according to information about the registered user, a prestored device identifier corresponding to the communications terminal; a management and control instruction generating module, configured to convert, according to a predetermined data exchange format, the received operation information and the acquired device identifier into a management and control instruction; and a push service module, configured to provide the management and control instruction for the communications terminal in a push service manner, so that the communications terminal works according to the management and control instruction.

In a first implementation manner of this aspect, the push service module is further configured to start to provide a push service for the communications terminal in response to a push service registration request of the communications terminal.

In a second implementation manner of this aspect, the server for remotely controlling working of a communications terminal further includes a registration information management module, and the registration information management module is configured to manage registration information corresponding to the communications terminal.

In another aspect, a method for remotely controlling working of a communications terminal is provided, the method is applied in a server for remotely controlling working of a communications terminal, and the method for remotely controlling working of a communications terminal includes the following steps of receiving operation information generated by an input operation of a registered user on a network terminal, where the operation information includes command information and additional information; acquiring, according to information about the registered user, a prestored device identifier corresponding to the communications terminal; converting, by using a predetermined data exchange format, the received operation information and the acquired device identifier into a management and control instruction; and providing the management and control instruction for the communications terminal in a push service manner, so that the communications terminal works according to the management and control instruction.

In a first implementation manner of this aspect, the method further includes the following step: starting to provide a push service for the communications terminal in response to a push registration request of the communications terminal.

In a second implementation manner of this aspect, the method further includes the following step: in response to a login request of the communications terminal, starting to manage registration information corresponding to the communications terminal.

In another aspect, a communications terminal is provided, and the communications terminal includes: a push service client module, configured to receive, in a push service manner, a management and control instruction actively provided by a server; an instruction parsing module, configured to parse, according to a predetermined data exchange format, the received management and control instruction, so as to obtain corresponding operation information and acquire a device identifier, where the operation information includes command information and additional information; a working instruction generating module, configured to generate a corresponding working instruction according to the command information and the additional information that are obtained through parsing; and a working instruction executing module, configured to execute, according to the working instruction, corresponding work for protecting data security.

In a first implementation manner of this aspect, the command information is SMS message forwarding command information, the additional information is a mobile phone number of a receiver of a forwarded SMS message, and the working instruction generating module generates a corresponding SMS message forwarding instruction according to the command information and the additional information that are obtained through parsing; and the working instruction executing module includes a determining unit, a SMS message monitoring unit, and a SMS message forwarding unit, where the determining unit is configured to determine a type of the working instruction, and when determining that the working instruction is a SMS message forwarding instruction, determine a state of an SIM card, and when determining that the state of the SIM card is a ready state, control the SMS message monitoring unit to start working; the SMS message monitoring unit is configured to monitor a new incoming SMS message, and when a new incoming SMS message is monitored, control the SMS message forwarding unit to work; and the SMS message forwarding unit is configured to send the monitored new incoming SMS message to a communication device corresponding to the mobile phone number of the receiver of the forwarded SMS message.

In a second implementation manner of this aspect, the working instruction executing module further includes a result reporting unit, and the determining unit is further configured to, when determining that the state of the SIM card is a non-ready state, control the result reporting unit to work; and the result reporting unit is configured to generate setting failure information, and transmit the setting failure information to a remote server, so that the server provides a network terminal with prompt information about a setting failure.

In a third implementation manner of this aspect, the command information is screen locking command information, the additional information is password information, and the working instruction generating module is configured to generate a corresponding screen locking instruction according to the command information and the additional information that are obtained through parsing; the working instruction executing module includes a determining unit and a screen locking unit, where the determining unit is configured to determine a type of the working instruction, and when determining that the working instruction is a screen locking instruction, control the screen locking unit to work; and the screen locking unit is configured to execute a screen locking operation to protect data security.

In a fourth implementation manner of this aspect, the determining unit, when determining that the working instruction is a screen locking instruction, determines whether a device management assembly of the communications terminal is activated, and when determining that the device management assembly of the communications terminal is in activated state, control the screen locking unit to work; and the screen locking unit works, according to the additional information in the screen locking instruction, to perform a screen locking operation to protect data security.

In a fifth implementation manner of this aspect, the screen locking unit, when determining that the additional information is not empty, performs a screen locking operation to protect data security; and the screen locking unit unlocks a screen when determining that the additional information is empty.

In another aspect, a method for remotely controlling working of a communications terminal is provided, the method is applied in a communications terminal having a connection established with a remote server, and the method for remotely controlling working of a communications terminal includes the following steps of receiving, in a push service manner, a management and control instruction actively provided by the server; parsing, according to the predetermined data exchange format, the received management and control instruction, so as to obtain corresponding operation information and acquire a device identifier, where the operation information includes command information and additional information; generating a corresponding working instruction according to the command information and the additional information that are obtained through parsing; and executing, according to the working instruction, work for protecting data security.

In a first implementation manner of this aspect, the command information is SMS message forwarding command information, the additional information is a mobile phone number of a receiver of a forwarded SMS message, and a corresponding SMS message forwarding instruction is generated according to the command information and the additional information that are obtained through parsing; and the step of executing, according to the working instruction, work for protecting data security specifically includes determining a type of the working instruction; when it is determined that the working instruction is a SMS message forwarding instruction, determining a state of a SIM card; when it is determined that the state of the SIM card is a ready state, monitoring a new incoming SMS message; and sending the new incoming SMS message to a communication device corresponding to the mobile phone number of the receiver of the forwarded SMS message.

In a second implementation manner of this aspect, when it is determined that the state of the SIM card is a non-ready state, setting failure information is generated; and the setting failure information is transmitted to the remote server, so that the server provides a network terminal with prompt information about a setting failure.

In a third implementation manner of this aspect, the command information is screen locking command information, the additional information is a password information, and a corresponding screen locking instruction is generated according to the command information and the additional information that are obtained through parsing; and the step of executing, according to the working instruction, work for protecting data security specifically includes determining a type of the working instruction; and when it is determined that the working instruction is a screen locking instruction, executing a screen locking operation to protect data security.

In a fourth implementation manner of this aspect, when it is determined that the working instruction is a screen locking instruction, it is determined whether a device management assembly of the communications terminal is activated; and when it is determined that the device management assembly of the communications terminal is in activated state, a screen locking operation is performed according to the additional information in the screen locking instruction, so as to protect data security.

In a fifth implementation manner of this aspect, when it is determined that the additional information is not empty, a screen locking operation is performed to protect data security; and when it is determined that the additional information is empty, a screen is unlocked.

Beneficial effects of the present invention lie in that different from the situation in the prior art, by means of the server and method for remotely controlling working of a communications terminal and the communications terminal according to the present invention, when a communications terminal (for example, a mobile phone) is lost or is forgotten to be carried, an owner only needs to log in to a network terminal to immediately and remotely control the communications terminal that is not carried by the owner to work, thereby ensuring security of personal data in the communications terminal, for example, forwarding a SMS message in the communications terminal to any mobile phone that can receive the SMS message, and remotely locking a screen of the communications terminal to ensure that the lost mobile phone is not used. Meanwhile, the implementation manners of the present invention do not need to modify network elements in the existing network or mobile network, thereby saving costs.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
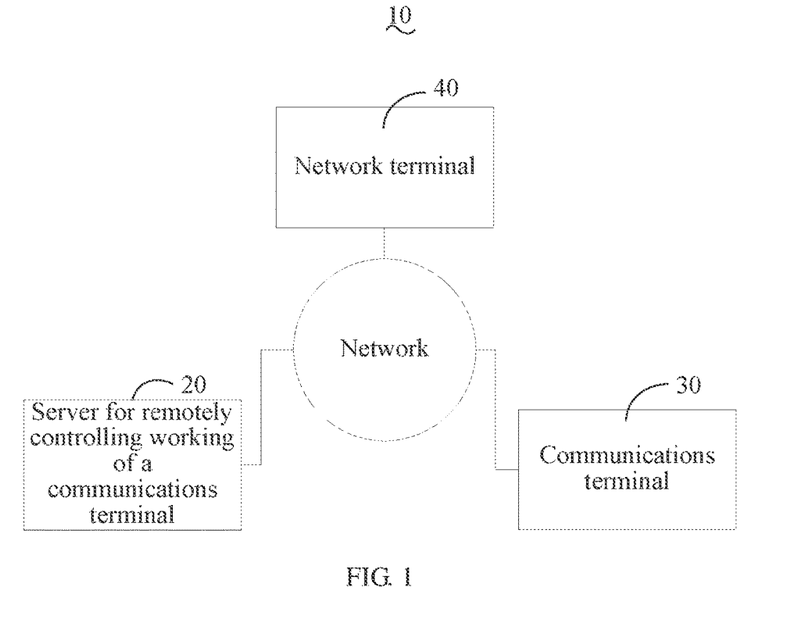
FIG. 1 is a schematic diagram of application architecture of a system for remotely controlling working of a communications terminal according to an exemplary embodiment.

In this implementation manner, a communications terminal (for example, a mobile phone) is used to establish a network connection with a server, and an owner sends operation information to the server, so that the server performs remote control on a communications terminal that is not carried by the owner, thereby ensuring security of personal data in the communications terminal. Referring to FIG. 1, a system 10 for remotely controlling working of a communications terminal includes a server 20 for remotely controlling working of a communications terminal, a communications terminal 30, and a network terminal 40. The communications terminal 30, the network terminal 40, and the server 20 for remotely controlling working of a communications terminal are connected through a network, such as a wireless network and a wired network, and the communications terminal 30 may be a mobile phone. The network terminal 40 may be a personal computer, a personal digital assistant (PDA, Personal Digital Assistant), and the like.

The communications terminal 30 of the owner only needs to establish a network connection with the server 20 for remotely controlling working of a communications terminal, implement a registration operation on the server 20 for remotely controlling working of a communications terminal to become a registered user, and subscribe to a push service at the same time, so as to implement ensuring of security of personal data in the communications terminal 30, such as remotely setting SMS message forwarding and remotely locking a screen of the communications terminal 30.

Implementation solutions of the server 20 for remotely controlling working of a communications terminal, and the communications terminal 30 are described specifically in the following, so that a person skilled in the art understands and implements the present invention.

Figure 2:
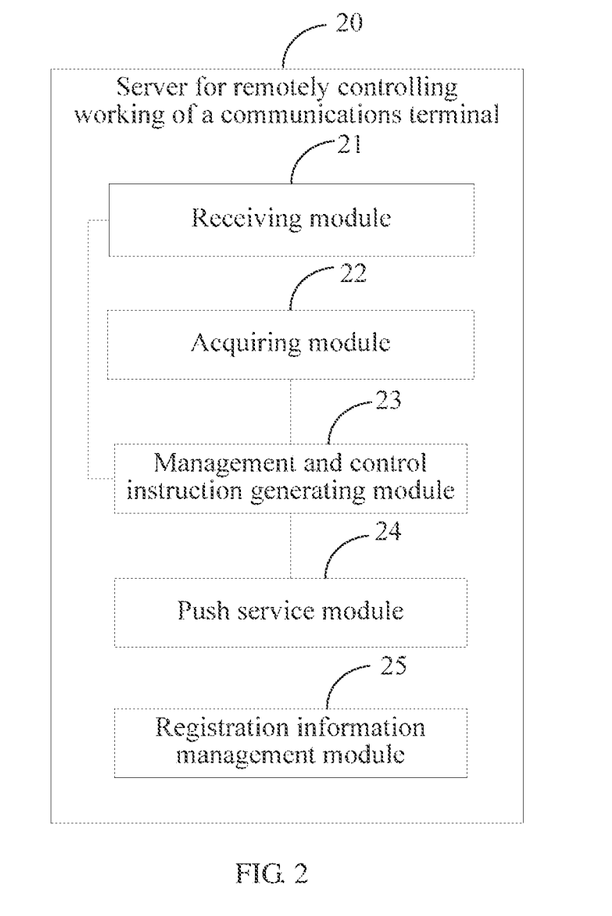
FIG. 2 is a functional block diagram of a server for remotely controlling working of a communications terminal in FIG. 1.

Referring to FIG. 2, the server 20 for remotely controlling working of a communications terminal includes the following modules.

A receiving module 21 is configured to receive operation information generated by an input operation of a registered user on the network terminal 40, where the operation information includes command information and additional information. For example, the server 20 for remotely controlling working of a communications terminal provides the registered user with an input interface for controlling the communications terminal 30, and the registered user may access the input interface and input the operation information on the input interface.

An acquiring module 22 is configured to acquire, according to information about the registered user, a prestored device identifier corresponding to the communications terminal 30, where the device identifier is an identifier symbol used for the server 20 for remotely controlling working of a communications terminal to identify the communications terminal 30 after the registered user is registered with the server 20 for remotely controlling working of a communications terminal through the communications terminal 30, for example, when a push service is registered, the device identifier is a Device Token.

A management and control instruction generating module 23 is configured to convert, according to a predetermined data exchange format, the received operation information and the acquired device identifier into a management and control instruction, where the predetermined data exchange format may be a lightweight data exchange format, for example, JSON (JavaScript Object Notation).

A push service module 24 is configured to provide, in a push service manner, the management and control instruction for the communications terminal 30, so that the communications terminal 30 works according to the management and control instruction, where the server 20 for remotely controlling working of a communications terminal generates a unique session identification (Session ID) each time when sending the management and control instruction, and the session identification is used to match a result returned by the communications terminal 30.

Further, the push service module 24 is further configured to start to provide a push service for the communications terminal 30 in response to a push service registration request of the communications terminal 30; the server 20 for remotely controlling working of a communications terminal further includes a registration information management module 25, and the registration information management module 25 is configured to manage registration information corresponding to the communications terminal 30.

Figure 3:
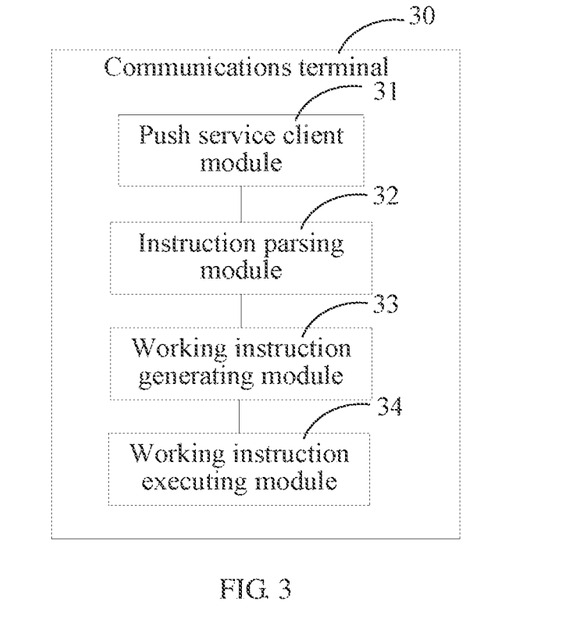
FIG. 3 is a functional block diagram of a communications terminal in FIG. 1.

Referring to FIG. 3, the communications terminal 30 includes the following modules.

A push service client module 31 is configured to receive, in a push service manner, a management and control instruction actively provided by the server 20. For example, the server 20 for remotely controlling working of a communications terminal sends the management and control instruction in a broadcasting manner, and the push service client module 31 may receive, in a broadcast receiving manner, the management and control instruction.

An instruction parsing module 32 is configured to parse, according to a predetermined data exchange format, the received management and control instruction, so as to obtain corresponding operation information and acquire a device identifier, where the operation information includes command information and additional information. The predetermined data exchange format may be a lightweight data exchange format, for example, JSON (JavaScript Object Notation).

The working instruction generating module 33 is configured to generate a corresponding working instruction according to the command information and the additional information that are obtained through parsing by the instruction parsing module 32.

The working instruction executing module 34 is configured to execute, according to the working instruction, corresponding work for protecting data security.

Figure 4:
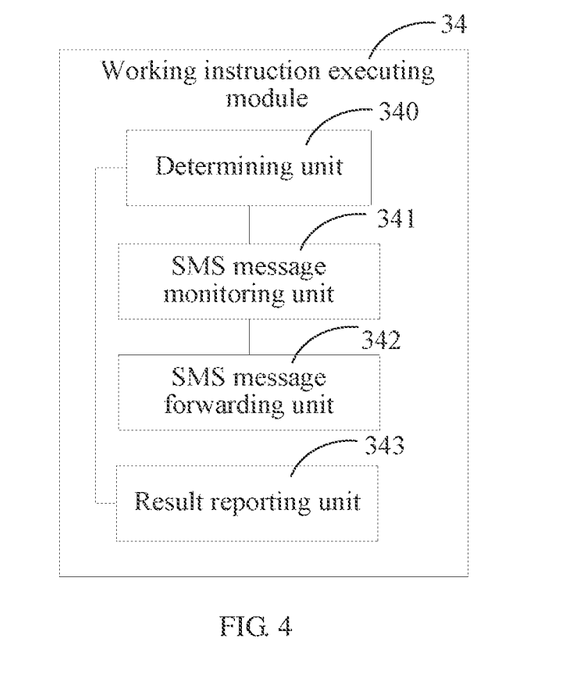
FIG. 4 is a functional block diagram of a working instruction executing module in FIG. 3.

For example, in an embodiment of SMS message forwarding, referring to FIG. 4, the command information is SMS message forwarding command information, the additional information is a mobile phone number of a receiver of a forwarded SMS message, and the working instruction generating module 33 generates a corresponding SMS message forwarding instruction according to the command information and the additional information that are obtained through parsing; further, the working instruction executing module 34 includes a determining unit 340, a SMS message monitoring unit 341, and a SMS message forwarding unit 342.

The determining unit 340 is configured to determine a type of the working instruction, when determining that the working instruction is a SMS message forwarding instruction, determine a state of a SIM card, and when determining that the state of the SIM card is a ready state, control the SMS message monitoring unit 341 to start working; the SMS message monitoring unit 341 is configured to monitor a new incoming SMS message, and when a new incoming SMS message is monitored, control the SMS message forwarding unit 342 to work; and the SMS message forwarding unit 342 is configured to send, according to the additional information, the monitored new incoming SMS message and a current mobile phone number to a communication device corresponding to the mobile phone number of the receiver of the forwarded SMS message. In this way, if a card of the lost communications terminal 30 is not changed, SMS messages sent to an original number A are all forwarded, and if the communications terminal 30 has been changed to a number B, when there is a SMS message sent to the number B, the communications terminal 30 still forwards the SMS message sent to the number B and the number B to a mobile phone, capable of receiving them, of the user whose mobile phone is lost. Further, the working instruction executing module 34 further includes a result reporting unit 343, the determining unit 340 is further configured to, when determining that the state of the SIM card is a non-ready state, control the result reporting unit 343 to work; and the result reporting unit 343 is configured to generate setting failure information, and transmit the setting failure information to the server 20 for remotely controlling working of a communications terminal, so that the server 20 for remotely controlling working of a communications terminal provides the network terminal 40 with prompt information about a setting failure.

Figure 5:
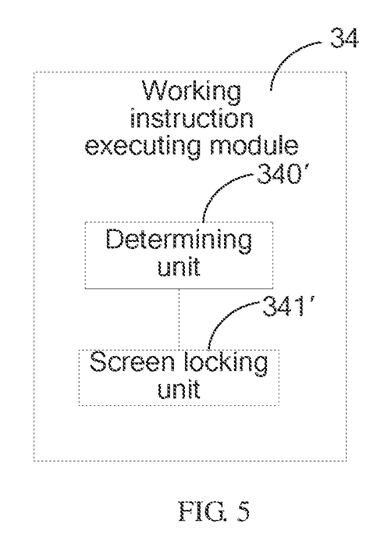
FIG. 5 is another functional block diagram of a working instruction executing module in FIG. 3.

For example, in an embodiment of screen locking, referring to FIG. 5, the command information is screen locking command information, the additional information is password information, and the working instruction generating module 33 is configured to generate a corresponding screen locking instruction according to the command information and the additional information that are obtained through parsing; and the working instruction executing module 34 includes a determining unit 340' and a screen locking unit 341'.

The determining unit 340' is configured to determine a type of the working instruction, and when determining that the working instruction is a screen locking instruction, control the screen locking unit 341' to work; and the screen locking unit 341' is configured to execute a screen locking operation to protect data security.

Further, the determining unit 340' determines, when determining that the working instruction is the screen locking instruction, whether a device management assembly of the communications terminal 30 is activated, and when determining that the device management assembly of the communications terminal 30 is in activated state, controls the screen locking unit 341' to work; the screen locking unit 341' works according to the additional information in the screen locking instruction, so as to perform the screen locking operation to protect data security, that is, the screen locking unit 341' performs, when determining that the additional information is not empty, the screen locking operation to protect data security; and the screen locking unit 341' unlocks a screen when determining that the additional information is empty.

Figure 6:
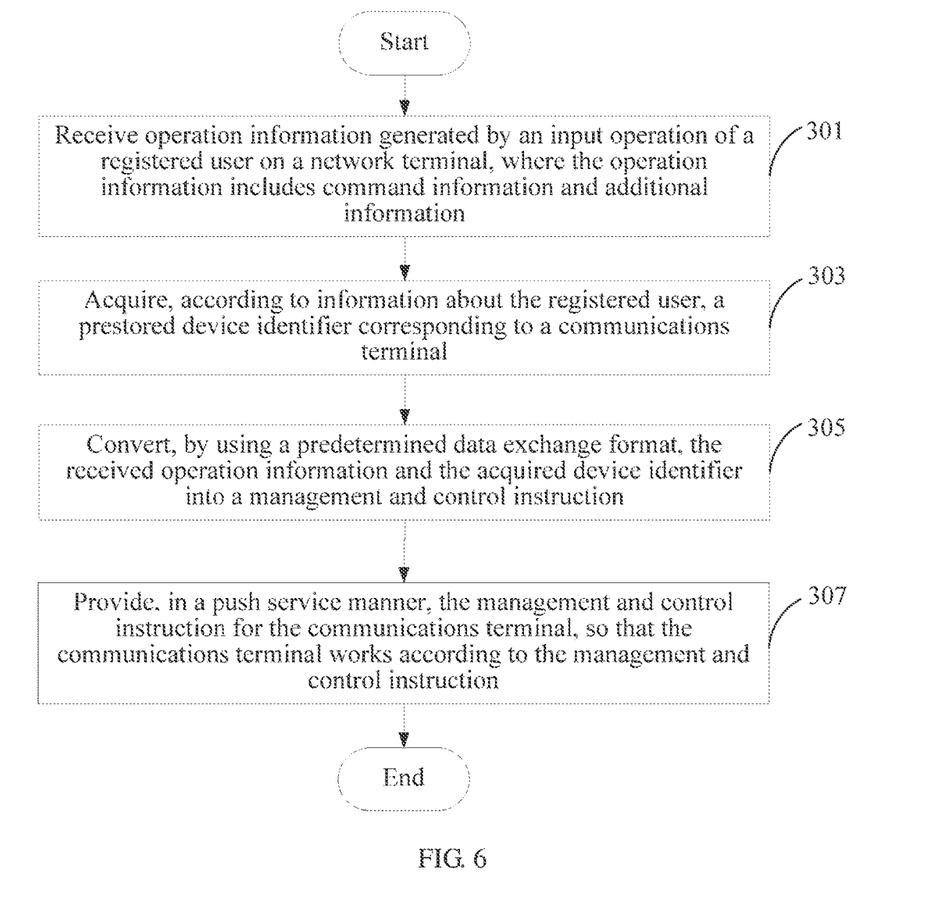
FIG. 6 is a flow chart of a method for remotely controlling working of a communications terminal according to an exemplary embodiment.

Referring to FIG. 6, a method for remotely controlling working of a communications terminal is applied in a server for remotely controlling working of a communications terminal, so that the server performs remote control on a communications terminal that is not carried by an owner, thereby ensuring security of personal data in the communications terminal. The method for remotely controlling working of a communications terminal includes the following steps.

Step S301: receive operation information generated by an input operation of a registered user on a network terminal, where the operation information includes command information and additional information.

Step S303: acquire, according to information about the registered user, a prestored device identifier corresponding to the communications terminal.

Step S305: convert, by using a predetermined data exchange format, the received operation information and the acquired device identifier into a management and control instruction, where the predetermined data exchange format may be a lightweight data exchange format, for example, JSON (JavaScript Object Notation).

Step S307: provide, in a push service manner, the management and control instruction for the communications terminal, so that the communications terminal works according to the management and control instruction.

The method for remotely controlling working of a communications terminal further includes the following steps of starting to provide a push service for the communications terminal in response to a push registration request of the communications terminal; and in response to a login request of the communications terminal, starting to manage registration information corresponding to the communications terminal.

Figure 7:
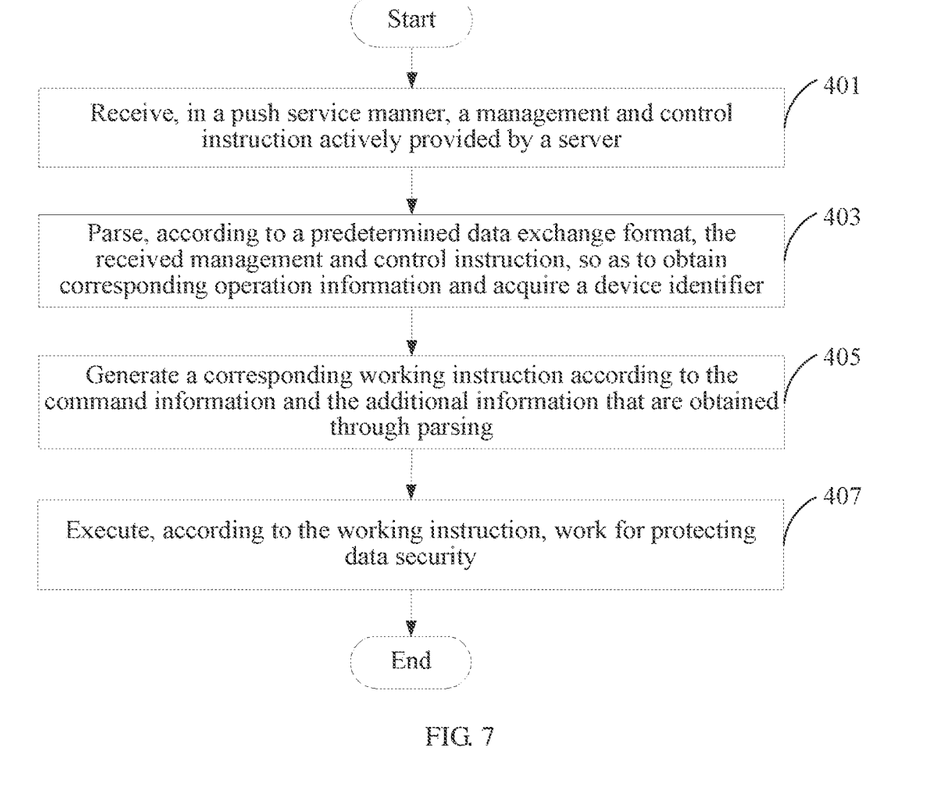
FIG. 7 is a flow chart of a method for remotely controlling working of a communications terminal according to another exemplary embodiment.

Referring to FIG. 7, a method for remotely controlling working of a communications terminal is applied in a communications terminal having a connection established with a remote server, and the method for remotely controlling working of a communications terminal includes the following steps.

Step S401: receive, in a push service manner, a management and control instruction actively provided by a server.

Step S403: parse, according to a predetermined data exchange format, the received management and control instruction, so as to obtain corresponding operation information and acquire a device identifier, where the operation information includes command information and additional information, and the predetermined data exchange format may be a lightweight data exchange format, for example, JSON (JavaScript Object Notation).

Step S405: generate a corresponding working instruction according to the command information and the additional information that are obtained through parsing.

Step S407: execute, according to the working instruction, work for protecting data security.

For example, in an embodiment of SMS message forwarding, the command information is SMS message forwarding command information, the additional information is a mobile phone number of a receiver of a forwarded SMS message, and a corresponding SMS message forwarding instruction is generated according to the command information and the additional information that are obtained through parsing; and the step of executing, according to the working instruction, work for protecting data security specifically includes the following.

Determining a type of the working instruction.

When it is determined that the working instruction is a SMS message forwarding instruction, determining a state of a SIM card.

When it is determined that the state of the SIM card is a ready state, monitoring a new incoming SMS message.

Sending the new incoming SMS message to a communication device corresponding to the mobile phone number of the receiver of the forwarded SMS message.

When it is determined that the state of the SIM card is a non-ready state, generating setting failure information.

Transmitting the setting failure information to the server, so that the server provides a network terminal with prompt information about a setting failure.

For example, in an embodiment of screen locking, the command information is screen locking command information, the additional information is password information, and a corresponding screen locking instruction is generated according to the command information and the additional information that are obtained through parsing; and the step of executing, according to the working instruction, work for protecting data security specifically includes the following.

Determining a type of the working instruction.

When it is determined that the working instruction is a screen locking instruction, executing a screen locking operation to protect data security, specifically including, when it is determined that the working instruction is the screen locking instruction, determining whether a device management assembly of the communications terminal is activated; when it is determined that the device management assembly of the communications terminal is in activated state, performing, according to the additional information in the screen locking instruction, a screen locking operation to protect data security, that is, when it is determined that the additional information is not empty, performing the screen locking operation to protect data security; and unlocking a screen when it is determined that the additional information is empty.

By means of descriptions of the foregoing embodiments, compared with the prior art, the present invention has the following advantages, including, by means of the server and method for remotely controlling working of a communications terminal and the communications terminal according to the present invention, when a communications terminal (for example, a mobile phone) is lost or is forgotten to be carried, an owner only needs to log in to a network terminal to immediately and remotely control the communications terminal that is not carried by the owner to work, thereby ensuring security of personal data in the communications terminal, for example, forwarding a SMS message in the communications terminal to any mobile phone that can receive the SMS message, and remotely locking a screen of the communications terminal to ensure that the lost mobile phone is not used. Meanwhile, the implementation manners of the present invention do not need to modify network elements in the existing network or mobile network, thereby saving costs.

In the several embodiments provided in the present application, it should be understood that the disclosed system, apparatus, and method may be implemented in other manners. For example, the described apparatus embodiment is merely exemplary. For example, the division of the modules or units is merely logical function division and may be other division in actual implementation. For example, a plurality of units or components may be combined or integrated into another system, or some features may be ignored or not executed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes any medium that can store program codes, such as a USB flash disk, a removable hard disk, a read-only memory (ROM, Read-Only Memory), a random access memory (RAM, Random Access Memory), a magnetic disk, or an optical disk.

It should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, without departing from the spirit and scope of the technical solutions of the embodiments of the present invention.

What is claimed is:

1. A server comprising:
a processor; and
a non-transitory computer readable medium connected to the processor and having stored thereon instructions for causing the processor to:
communicate with, and remotely control, a communications terminal through a network;
receive operation information generated by an input operation of a registered user on a network terminal, wherein the operation information comprises command information and additional information;
acquire, according to information about the registered user, a prestored device identifier corresponding to the communications terminal;
convert, according to a predetermined data exchange format, the received operation information and the acquired device identifier into a management and control instruction; and
provide the management and control instruction to the communications terminal in a push service manner, wherein the providing the management and control instruction causes the communications terminal to work according to the management and control instruction by implementing the command information according to the additional information in response to the communications terminal receiving the management and control instruction, wherein the command information indicates a type of control of the communications terminal, and wherein the additional information is a parameter used in implementing the command information.

2. The server according to claim 1, wherein the non-transitory computer readable medium further has stored thereon instructions for causing the processor to start to provide a push service for the communications terminal in response to a push service registration request of the communications terminal.

3. The server according to claim 1, wherein the non-transitory computer readable medium further has stored thereon instructions for causing the processor to manage registration information corresponding to the communications terminal.

4. A method comprising:
receiving, on a server configured to remotely control operation of a communications terminal, operation information generated by an input operation of a registered user on a network terminal, wherein the operation information comprises command information and additional information;
acquiring, according to information about the registered user, a prestored device identifier corresponding to the communications terminal;
converting, by using a predetermined data exchange format, the received operation information and the acquired device identifier into a management and control instruction; and
providing the management and control instruction to the communications terminal in a push service manner, wherein the providing the management and control instruction causes the communications terminal to work according to the management and control instruction by implementing the command information according to the additional information in response to the communications terminal receiving the management and control instruction, wherein the command information indicates a type of control of the communications terminal, and wherein the additional information is a parameter used in implementing the command information.

5. The method according to claim 4, further comprising starting a push service for the communications terminal in response to a push service registration request of the communications terminal.

6. The method according to claim 4, further comprising:
starting management of registration information corresponding to the communications terminal;
wherein the starting management of the registration information is performed in response to a login request of the communications terminal.

7. A communications terminal, comprising:
a processor; and
a non-transitory computer readable medium connected to the processor and having stored thereon instructions for causing the processor to:
receive, in a push service manner, a management and control instruction that is actively provided by a server;
parse, according to a predetermined data exchange format, the received management and control instruction, so as to obtain corresponding operation information, wherein the operation information comprises command information and additional information;
generate a corresponding working instruction according to the command information and the additional information that are obtained through the parsing, wherein the command information indicates a type of control of the communications terminal, and wherein the additional information is a parameter for the command information; and
execute, according to the working instruction, corresponding work for protecting data security.

8. The communications terminal according to claim 7, wherein the command information is short message service (SMS) message forwarding command information;
wherein the additional information is a mobile phone number of a receiver of a forwarded SMS message; and
wherein the non-transitory computer readable medium further has stored thereon instructions for causing the processor to:
generate a corresponding SMS message forwarding instruction according to the command information and the additional information that are obtained through the parsing; and
determine a type of the working instruction;
determine a state of an SIM card in response to determining that the working instruction is a SMS message forwarding instruction;
monitor a new incoming SMS message in response to determining that the state of the SIM card is a ready state; and
send, in response to a new incoming SMS message being monitored, the monitored new incoming SMS message to a communication device corresponding to the mobile phone number of the receiver of the forwarded SMS message.

9. The communications terminal according to claim 8, wherein the non-transitory computer readable medium further has stored thereon instructions for causing the processor to: generate setting failure information in response to determining that the state of the SIM card is a non-ready state; and
transmit the setting failure information to a remote server, so that the remote server provides a network terminal with prompt information about a setting failure.

10. The communications terminal according to claim 7, wherein the command information is screen locking command information, and the additional information is password information; and
wherein the non-transitory computer readable medium further has stored thereon instructions for causing the processor to:
generate a corresponding screen locking instruction according to the command information and the additional information that are obtained through the parsing;
determine a type of the working instruction; and
execute a screen locking operation to protect data security in response to determining that the type of the working instruction is a screen locking instruction.

11. The communications terminal according to claim 10, wherein the non-transitory computer readable medium further has stored thereon instructions for causing the processor to:
determine, in response to determining that the type of the working instruction is a screen locking instruction, whether a device management assembly of the communications terminal is activated; and perform a screen locking operation according to the additional information in the screen locking instruction, and in response to determining that the device management assembly of the communications terminal is in activated state.

12. The communications terminal according to claim 11, wherein the non-transitory computer readable medium further has stored thereon instructions for causing the processor to:

perform a screen locking operation in response the additional information being not empty; and unlock a screen in response to the additional information being empty.

13. A method comprising:

receiving, in a push service manner and at a communications terminal configured to be remotely controlled and having a connection established with a remote server, a management and control instruction actively provided by the remote server;

parsing, according to a predetermined data exchange format, the received management and control instruction, so as to obtain corresponding operation information, wherein the operation information comprises command information and additional information;

generating a corresponding working instruction according to the command information and the additional information that are obtained through the parsing, wherein the command information indicates a type of control of the communications terminal, and wherein the additional information is a parameter for the command information; and executing, according to the working instruction, work for protecting data security.

14. The method according to claim 13, wherein the command information is SMS message forwarding command information;

wherein the additional information is a mobile phone number of a receiver of a forwarded SMS message;

wherein a corresponding SMS message forwarding instruction is generated according to the command information and the additional information that are obtained through parsing; and wherein the executing, according to the working instruction, work for protecting data security comprises:

determining a type of the working instruction;

determining a state of a SIM card in response to determining that the working instruction is a SMS message forwarding instruction;

monitoring a new incoming SMS message in response to determining that the state of the SIM card is a ready state; and sending the new incoming SMS message to a communications device corresponding to the mobile phone number of the receiver of the forwarded SMS message.

15. The method according to claim 14, wherein:

generating setting failure information in response to determining that the state of the SIM card is a non-ready state; and transmitting the setting failure information to the remote server, so that the server provides a network terminal with prompt information about a setting failure.

16. The method according to claim 13, wherein:

the command information is screen locking command information, the additional information is a password information, and a corresponding screen locking instruction is generated according to the command information and the additional information that are obtained through parsing; and wherein the executing, according to the working instruction, work for protecting data security comprises:

determining a type of the working instruction; and executing a screen locking operation in response to determining that the type of the working instruction is a screen locking instruction.

17. The method according to claim 16, further comprising:

determining, in response to determining that the working instruction is a screen locking instruction, whether a device management assembly of the communications terminal is activated; and performing, in response to determining that the device management assembly of the communications terminal is in activated state, a screen locking operation according to the additional information in the screen locking instruction.

18. The method according to claim 17, further comprising:

performing a screen locking operation to protect data security and in response to the additional information being not empty; and unlocking a screen in response to the additional information being empty.

19. The communications terminal according to claim 10, wherein, after the executing the screen locking instruction, the communications terminal is unlockable, by a user, using the password information.

20. The method according to claim 16, wherein, after the executing the screen locking instruction, the communications terminal is unlockable, by a user, using the password information.

* * * * *